Oct. 18, 1932.   J. L. FINCK   1,883,774
MEANS FOR INSULATING BUILDINGS AND LIKE STRUCTURES
Filed Feb. 1, 1928
Fig. 1.
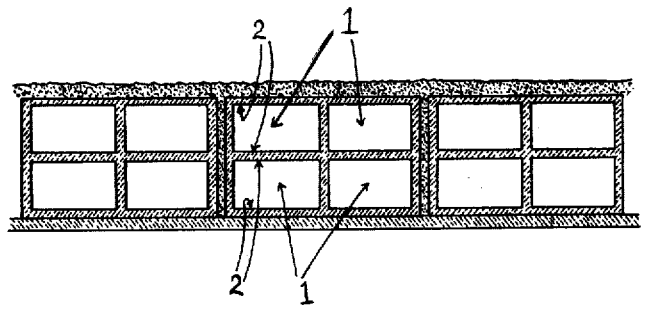
Fig. 2.
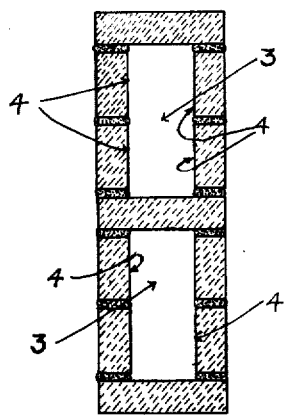
Fig. 3.
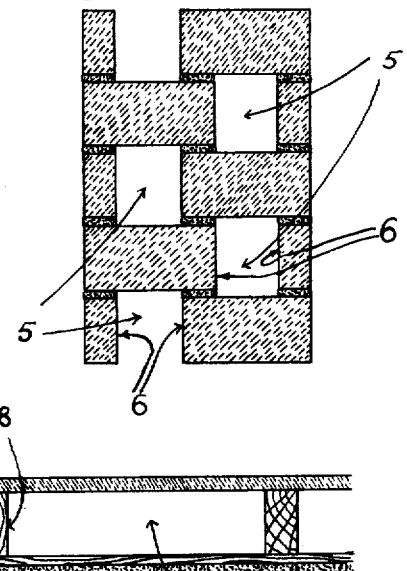
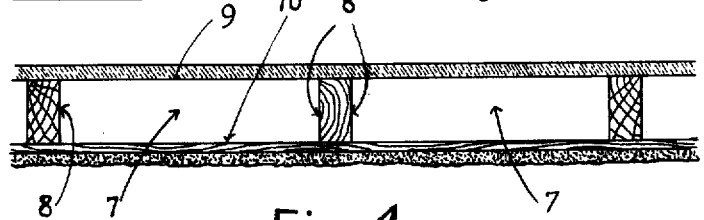
Fig. 4.
Joseph L. Finck, INVENTOR.
BY S. P. Wolhaupter
his ATTORNEY.

Patented Oct. 18, 1932

1,883,774

UNITED STATES PATENT OFFICE

JOSEPH LOUIS FINCK, OF WASHINGTON, DISTRICT OF COLUMBIA

MEANS FOR INSULATING BUILDINGS AND LIKE STRUCTURES

Application filed February 1, 1928. Serial No. 251,112.

This invention relates to the art of heat insulation, and more particularly to the insulation of building and like structures.

The total heat transfer through any structure may be considered as taking place in some or all of the following three forms; (a) conduction, (b) convection, and (c) radiation. The first form occurs when heat is being transferred through a solid, or through a quiescent fluid. The second occurs in a fluid, and is manifested by natural convection currents within the fluid. The third occurs in open spaces, whether those spaces be evacuated or filled with a fluid, as for example, air.

This invention is concerned entirely with the last form, radiation. If one should carry out numerical calculations of the magnitude of the heat transferred by radiation at room temperature, basing the calculations on Stefan-Boltzmann's law for total radiation, and also bearing in mind that the emissivity of materials ordinarily entering into building construction, such as wood, brick, paper, etc., may be as high as 80 or 90 per cent, one will find that this form of heat transfer is a very large fraction of the total heat transfer. At the present time, where a large number of air spaces are intentionally introduced into a structure, by using hollow tile, studding, or a brick construction so arranged as to form air spaces, radiation becomes the chief mode of heat transfer.

I propose to reduce the amount of heat transfer by radiation through a simple and effective method, namely, by utilizing the high reflecting power of metals. My method is to coat with metal the surfaces of materials which enter into the construction of buildings and the like, in order to reduce the heat transferred by radiation. It will be evident that only those walls which define the air spaces need be coated with metal.

A few practical examples of how the invention may be carried into effect are shown in the accompanying drawing, in which:—

Figure 1 is a horizontal cross-sectional view of a wall built of hollow tile illustrating one application of the invention.

Figures 2 and 3 are more or less diagrammatic views illustrating the application of the invention to a brick wall.

Figure 4 is a horizontal sectional view showing the application of the invention to a wall space formed by a wooden studding.

As previously indicated, in carrying this invention into effect, it is proposed to provide a rigid structure such as a building or other wall which is intended to prevent heat exchange from one zone or space to another. That is to say, it is proposed to metallize one surface of a non-metallic sheet or wall in such a way as to utilize the heat reflecting power of metal to the best advantage.

It is practical, at the present time, to spray metal on any surface such as brick, wood, paper, etc. Of course, one would naturally select a metal that is comparatively cheap, easy to work, which has a reasonably low emissivity, and which will not oxidize very readily. Tin, or some alloy of tin and lead, might suit the purpose very well. However, no restrictions need be made as to the kind of metal to be used or to the method of applying the metal. Practically all metals will have emissivities much lower than those of building materials, and there will be material gain in using any metal. Further, one method of applying the metal may be easier than another, but however the metal is applied, whether by spraying or by pasting on metal foil, the result as far as the reduction in heat transfer by radiation is concerned, will be the same.

Referring more particularly to the drawing, it will be observed from Figure 1 that the air spaces 1, 1 of the hollow tile are defined by the surfaces 2, and these latter surfaces are to be coated with metal so as to reduce the heat transferred by radiation across these air spaces. Similarly, the surfaces 4, 4 of the air spaces 3, and surfaces 6, 6 of the air spaces 5 are to be coated with metal to reduce the radiation. In a frame wall, such as is represented in Fig. 4 the air spaces 7, 7 are usually formed by the studs 8, lath and plaster 9, and building paper or sheathing 10. To reduce the heat transfer by radiation in this case the several components may be coated with metal on those surfaces bordering on the air spaces 7, 7 or the bounding surfaces may be coated with metal after the materials are installed in the wall.

From the foregoing description it is believed that the essential features of the invention will be fully understood, and that it also is the intent to make the claimed invention applicable generally to the construction of walls, partitions, ceilings, floors and like structures.

I claim:—

1. A wall structure formed of a plurality of units of porous material, said wall containing one or more air spaces, the pressure within which air spaces being approximately equal to that of atmospheric pressure, and said units being coated with a thin film of metal on the heat transmitting surfaces thereof which bound the said air spaces.

2. A wall structure formed of a plurality of units of solid porous material, said wall containing one or more air spaces, the pressure within which air spaces is approximately equal to that of atmospheric pressure, and said units being coated with a thin film of substantially non-oxidizable metal on the heat transmitting surfaces which bound the said air spaces.

3. A wall structure including elements containing one or more air spaces, the pressure within said air spaces being approximately equal to that of atmospheric pressure, and the heat transmitting surfaces defining said air spaces being coated with a thin film of metal.

4. A wall structure, said wall structure containing one or more air spaces, the pressure within said air spaces being approximately equal to that of atmospheric pressure, and the heat transmitting surfaces defining said air spaces being coated with a thin film of substantially non-oxidizable metal.

5. A wall structure, said wall structure containing one or more air spaces, the heat transmitting surfaces defining said air spaces being formed of non-metallic materials and coated with a thin film of substantially non-oxidizable metal, and the pressure within said air spaces being approximately equal to that of atmospheric pressure.

6. A wall structure including elements containing one or more air spaces, the pressure within said air spaces being approximately equal to that of atmospheric pressure, and the heat transmitting surfaces defining said air spaces being coated with a thin film of substantially non-oxidizable metal.

7. A wall structure, including elements so arranged as to form one or more air spaces, the pressure within said air spaces being approximately equal to that of atmospheric pressure, and the heat transmitting surfaces defining said air spaces being coated with a thin film of substantially non-oxidizable metal.

8. A wall-structural unit made of porous materials, said unit containing one or more air spaces, the pressure within each of said air spaces being approximately equal to that of atmospheric pressure, and the heat transmitting surfaces defining said air spaces being coated with a thin film of substantially non-oxidizable metal.

9. A wall-structural unit made of non-metallic materials, said units containing one or more air spaces directly open to the atmosphere, and the heat transmitting surfaces defining said air spaces being coated with a thin film of substantially non-oxidizable metal.

10. A wall structure containing one or more air spaces, the pressure within said air spaces being approximately equal to that of atmospheric pressure, and a thin metallic coating carried by surfaces defining said air spaces and parallel to the outer wall surfaces.

11. A wall structure containing one or more air spaces having opposed faces substantially parallel to the outer faces of said wall, the pressure within said air spaces being approximately equal to atmospheric, and a thin metallic coating carried by one of said opposed faces in said air spaces.

12. A wall structure containing air spaces, the pressure within said air spaces being approximately equal to atmospheric, and building paper facing said air spaces, said building paper having a thin metallic coating on the face disposed towards said air spaces.

13. A wall structure containing air spaces, the pressure within said air spaces being approximately equal to atmospheric, and flexible sheet material disposed within said spaces, said material having a metallic surface exposed to said air space to reflect heat radiations.

14. A wall structure element made of non-metallic material for walls having one or more air spaces, the pressure within said air spaces being approximately equal to atmospheric, said element having a thin metal coating on the face parallel to the outer surface of the wall and disposed toward the air space to minimize the passage of radiated heat through said air space.

15. A wall structure containing air spaces, the pressure within said air spaces being approximately equal to atmospheric, and rigid, non-metallic sheeted material disposed against said spaces, said material having a metallic surface exposed toward said air spaces to reduce the passage of radiated heat through said air space.

16. A wall structure element made of rigid, non-metallic sheeted material for walls having one or more air spaces, the pressure within said air spaces being approximately equal to atmospheric, said element having a thin metal coating on the face parallel to the wall and disposed toward the air spaces to minimize the passage of radiated heat through said air spaces.

In testimony whereof I hereunto affix my signature.

JOSEPH LOUIS FINCK.

DISCLAIMER 1,883,774.—*Joseph Louis Finck*, Washington, D. C. MEANS FOR INSULATING BUILDINGS AND LIKE STRUCTURES. Patent dated October 18, 1932. Disclaimer filed February 3, 1936, by the patentee and the assignee, *I. Richard Paris*.

Hereby disclaim claim 13 of said patent except such wall structures as defined in said claim 13 wherein the flexible sheet material set forth in said claim 13 is non-metallic flexible sheet material and wherein the metallic surface set forth in said claim 13 is in the form of a thin metallic coating.

[*Official Gazette February 25, 1936.*]

metallic surface exposed toward said air spaces to reduce the passage of radiated heat through said air space.

16. A wall structure element made of rigid, non-metallic sheeted material for walls having one or more air spaces, the pressure within said air spaces being approximately equal to atmospheric, said element having a thin metal coating on the face parallel to the wall and disposed toward the air spaces to minimize the passage of radiated heat through said air spaces.

In testimony whereof I hereunto affix my signature.

JOSEPH LOUIS FINCK.

DISCLAIMER 1,883,774.—*Joseph Louis Finck*, Washington, D. C. MEANS FOR INSULATING BUILDINGS AND LIKE STRUCTURES. Patent dated October 18, 1932. Disclaimer filed February 3, 1936, by the patentee and the assignee, *I. Richard Paris*.

Hereby disclaim claim 13 of said patent except such wall structures as defined in said claim 13 wherein the flexible sheet material set forth in said claim 13 is nonmetallic flexible sheet material and wherein the metallic surface set forth in said claim 13 is in the form of a thin metallic coating.

[*Official Gazette February 25, 1936.*]

DISCLAIMER 1,883,774.—*Joseph Louis Finck*, Washington, D. C. MEANS FOR INSULATING BUILDINGS AND LIKE STRUCTURES. Patent dated October 18, 1932. Disclaimer filed February 3, 1936, by the patentee and the assignee, *I. Richard Paris*.

Hereby disclaim claim 13 of said patent except such wall structures as defined in said claim 13 wherein the flexible sheet material set forth in said claim 13 is nonmetallic flexible sheet material and wherein the metallic surface set forth in said claim 13 is in the form of a thin metallic coating.

[*Official Gazette February 25, 1936.*]